United States Patent
Evans

(10) Patent No.: US 8,418,958 B2
(45) Date of Patent: Apr. 16, 2013

(54) LANDING GEAR ACTUATION CONTROL SYSTEM

(75) Inventor: Royston Alan Evans, Gloucestershire (GB)

(73) Assignee: GE Aviation Systems Limited (GB)

(*) Notice: Subject to any disclaimer, the term of this patent is extended or adjusted under 35 U.S.C. 154(b) by 486 days.

(21) Appl. No.: 12/729,290

(22) Filed: Mar. 23, 2010

(65) Prior Publication Data

US 2010/0264265 A1 Oct. 21, 2010

(30) Foreign Application Priority Data

Apr. 15, 2009 (GB) .................................. 0906464.3

(51) Int. Cl.
*B64C 25/22* (2006.01)
*F15B 13/02* (2006.01)
*B66F 3/24* (2006.01)

(52) U.S. Cl.
USPC ......... 244/102 R; 91/444; 254/93 R; 254/122

(58) Field of Classification Search .............. 244/102 R, 244/102 SL, 102 SS; 254/93 R, 122, 134; 269/32; 91/444, 445, 448; 60/403
See application file for complete search history.

(56) References Cited

U.S. PATENT DOCUMENTS

| | | | | |
|---|---|---|---|---|
| 2,489,411 A * | 11/1949 | Harrington | ............... | 244/102 R |
| 3,327,974 A * | 6/1967 | Nicholl | ..................... | 244/100 R |
| 3,606,250 A * | 9/1971 | Sherman | ...................... | 254/423 |
| 4,579,042 A * | 4/1986 | Neff | ................. | 91/446 |
| 4,640,095 A * | 2/1987 | Engel et al. | ...................... | 60/443 |
| 4,730,543 A * | 3/1988 | Holmes | ......................... | 91/448 |
| 5,226,348 A * | 7/1993 | Dezelan et al. | ................. | 91/436 |
| 5,701,618 A * | 12/1997 | Brugger | .......................... | 5/611 |
| 6,182,925 B1 * | 2/2001 | Kilner et al. | ............ | 244/102 SL |
| 6,575,405 B2 * | 6/2003 | Bryant et al. | ............ | 244/102 SL |
| 6,625,982 B2 * | 9/2003 | Van Den Bossche et al. | .. | 60/403 |
| 6,837,045 B2 * | 1/2005 | Heusser | .......................... | 60/403 |
| 7,562,615 B2 * | 7/2009 | Abe et al. | ......................... | 91/436 |
| 7,810,755 B2 * | 10/2010 | Reynes | .................... | 244/104 FP |
| 8,028,954 B2 * | 10/2011 | Leutard et al. | ............. | 244/102 R |
| 8,136,760 B2 * | 3/2012 | Leutard et al. | ............. | 244/102 R |
| 8,151,813 B2 * | 4/2012 | Jacoby et al. | ....................... | 137/1 |
| 2004/0177749 A1 * | 9/2004 | Joergensen | ....................... | 91/445 |
| 2005/0082427 A1 | 4/2005 | Seung | | |
| 2006/0048643 A1 * | 3/2006 | Mohlmann | ..................... | 91/444 |
| 2008/0087765 A1 | 4/2008 | Leutard et al. | | |
| 2008/0087766 A1 * | 4/2008 | Leutard et al. | ............ | 244/102 R |
| 2008/0277525 A1 | 11/2008 | Reynes | | |
| 2009/0272257 A1 * | 11/2009 | Petronek | ........................ | 91/446 |

* cited by examiner

*Primary Examiner* — Joseph W Sanderson
(74) *Attorney, Agent, or Firm* — Global Patent Operation

(57) ABSTRACT

A hydraulic control system for an aircraft landing gear system has a hydraulic pressure source connected to a hydraulic fluid pressure transmission line, and at least one hydraulic actuator for extending and/or retracting a landing gear. A supply valve and a direction valve are arranged in series along the hydraulic fluid pressure transmission line. The supply valve and direction valve are adjustable to control the hydraulic pressure supplied to the at least one hydraulic actuator. The control system also controls uplock actuators.

11 Claims, 4 Drawing Sheets

LANDING GEAR ACTUATION CONTROL SYSTEM

CROSS-REFERENCE TO RELATED APPLICATIONS

This application claims priority under 35 U.S.C. §119(a)-(d) or (f) to prior-filed, co-pending British application number 0906464.3, filed on Apr. 15, 2009, which is hereby incorporated by reference in its entirety.

FIELD OF INVENTION

This invention relates to actuation control systems for aircraft landing gear, and in particular to valve arrangements for controlling the flow of hydraulic fluid around such actuation systems.

BACKGROUND OF THE INVENTION

Many aircraft are equipped with retractable landing gears, which typically can be raised following take-off and stowed in a closable compartment on the underside of the aircraft, e.g. in the wings. A landing gear may often be provided under either wing and under the nose of the aircraft.

When the landing gears have been raised, the gears are locked in place with uplocks, to prevent unintended extension of the landing gears, until such time as the landing gears are to be used again. It is desirable to include safety measures to ensure that when the landing gears are extended they do not accidentally retract, and that in the event of a malfunction of the hydraulic system, the landing gears can always be extended as necessary for landing.

A known hydraulic landing gear system 1 is shown schematically in FIG. 1 of the drawings, wherein a system including three landing gears is shown. A hydraulic fluid pressure line 5 and a hydraulic fluid return line 6 are connected to a hydraulic source (not shown) which is usually provided as part of the aircraft hydraulics system. A selector valve 2 is provided along the pressure and return lines 5,6 which is operable to direct the hydraulic pressure along first and second conduits 17,18 which lead to a plurality of hydraulic actuators 8,9,10,11,12,13. The actuators numbered 8,9 and 10 comprise first, second and third gear downlock actuators respectively, which are operable to lock the landing gears in the extended position, whilst the actuators numbered 11, 12 and 13 comprise first, second and third gear actuators, for extending and retracting the landing gears, and optionally the doors of the landing gear compartments. Alternatively, the doors may be actuated by means of a separate hydraulic system.

An uplock control valve 4 is hydraulically connected to the first conduit 17 for controlling first, second and third uplocks 14,15,16. The uplocks lock the landing gears in the retracted position to prevent unintended extension of the landing gears. A corresponding uplock system can be provided to control opening and closing of the doors to the closable compartments in which the landing gears are housed.

In one example, the first uplock 14, the first downlock actuator 8 and the first gear actuator 11 correspond to the right wing landing gear, while the second uplock 15, the second downlock actuator 9 and the second gear actuator 12 correspond to the left wing landing gear and the third uplock 16, the third downlock actuator 10 and the third gear actuator 13 correspond to the nose landing gear.

The selector valve 2 comprises first and second solenoids 19, 20 for moving the valve between first, second and third settings 23,24,25. First and second springs 21, 22 centre the valve, whereby the second setting 24 is the default status of the valve. When it is desired to extend the landing gears, the first solenoid 19 is operated to bias the valve elements to the right, thereby putting the valve in the first setting 23. Pressure is thus applied to the actuators 8,9,10,11,12,13 so as to extend the landing gears. In order to retract the landing gears, the second solenoid 20 is operated to bias the valve elements to the left, thus placing the valve in the third setting 25. When neither solenoid 19,20 is operated, the second setting 24 is selected. In the second setting 24, the valve inhibits the pressure from the pressure line 5 and connects both conduits 17,18 to the return line 6, thereby removing hydraulic pressure from the system.

The landing gear system also comprises a fail-safe free-fall system including a cut out valve 3 and a vent valve 7, which in the event of a selector valve 2 failure, are operable to ensure that the landing gears can be extended. In free-fall operation, the cut out valve 3 isolates the system from the hydraulic pressure, whilst the vent valve 7 provides an interconnection between the fluid conduits 26,27 downstream thereof. This results in a status of the system where the landing gears can extend under the influence of gravity.

The prior art hydraulic landing gear system 1 is complicated and backup systems are needed to operate the cut out and vent valves. Further, it is possible for inadvertent retractions of the landing gears to take place if a fault occurs in the selector valve 2. For example, if the second solenoid 20 is erroneously operated, e.g. due to a malfunction, the selector valve will move so that the valve element 25 is operative and the landing gears will retract. When the aircraft is on the ground, such a fault is both expensive and dangerous. Complex control and backup systems have to be provided to cater for the potential erroneous operation or failure of the solenoids 19,20. The prior art system is therefore expensive and is heavy due to the relatively large number of components needed.

SUMMARY OF THE INVENTION

The present invention provides a hydraulic control system for an aircraft landing gear system comprising a hydraulic pressure source connected to a hydraulic fluid pressure transmission line, and at least one hydraulic actuator for extending and/or retracting a landing gear, wherein first and second valves are provided in series along the hydraulic fluid pressure transmission line, the first and second valves being adjustable to control the hydraulic pressure supplied to the at least one hydraulic actuator.

If one of the first or second valves malfunctions, for example by jamming open, the other of the first and second valves can be operated to ensure that the landing gears can still be extended. It is unlikely that the first and second valves will both malfunction at the same time and advantageously, the system therefore offers a particularly simple way to provide fail-safe operation with improved reliability. The system according to the invention removes the need for the cut-out and vent valves and therefore utilises a reduced number of valve elements, reducing the mass of the system and the overall cost of production of the aircraft.

Preferably, the first and second valves comprise 2-way valves, rather than the 3-way valves used in the prior art. An advantageous cost saving is thereby provided as well as improved reliability.

BRIEF DESCRIPTION OF THE DRAWINGS

There follows a detailed description of embodiments of the invention, by way of example only, with reference to the accompanying drawings, in which.

DETAILED DESCRIPTION OF THE INVENTION

Figure 1:
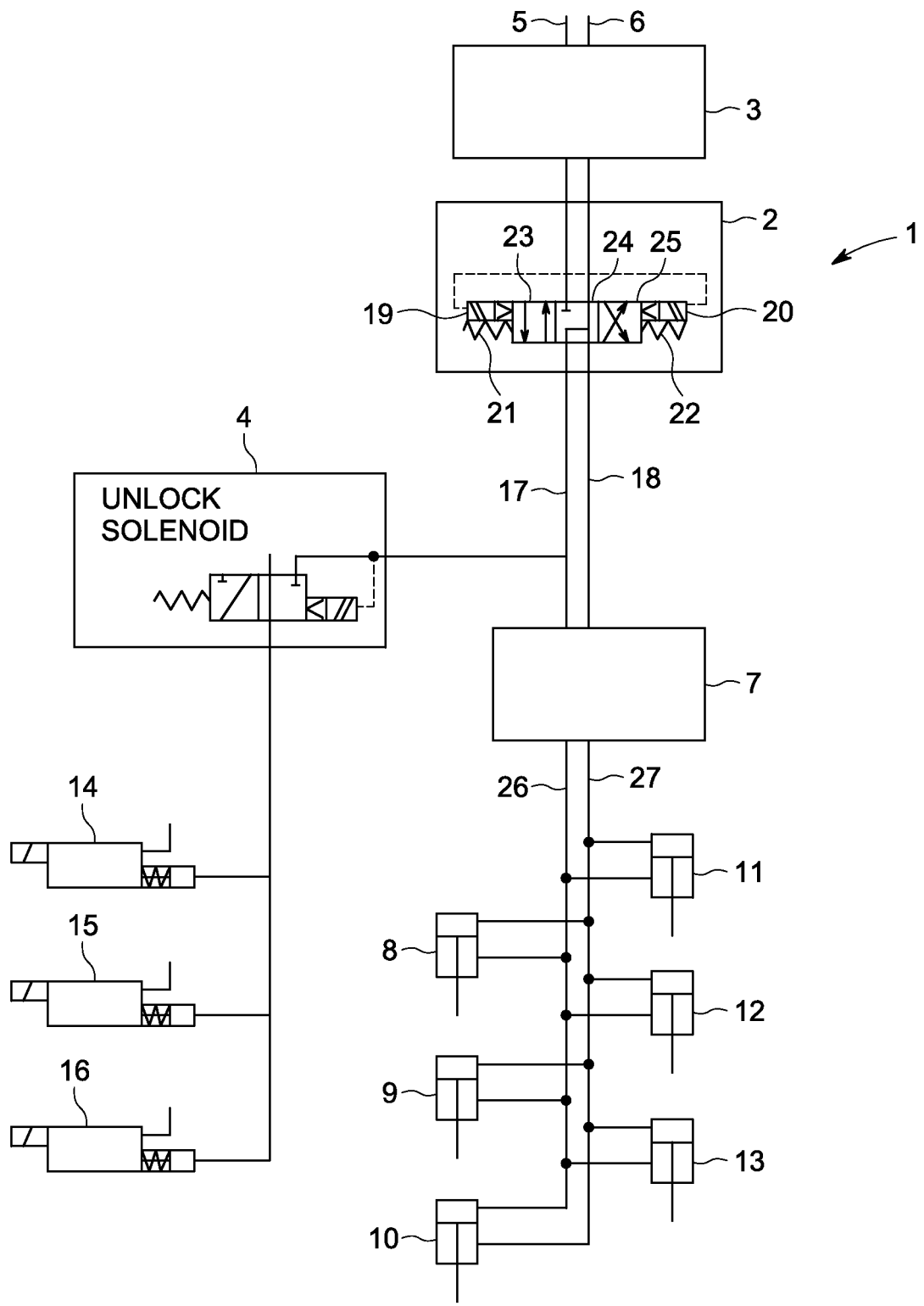
FIG. 1 shows schematically a hydraulic landing gear system according to the prior art.
Figure 2:
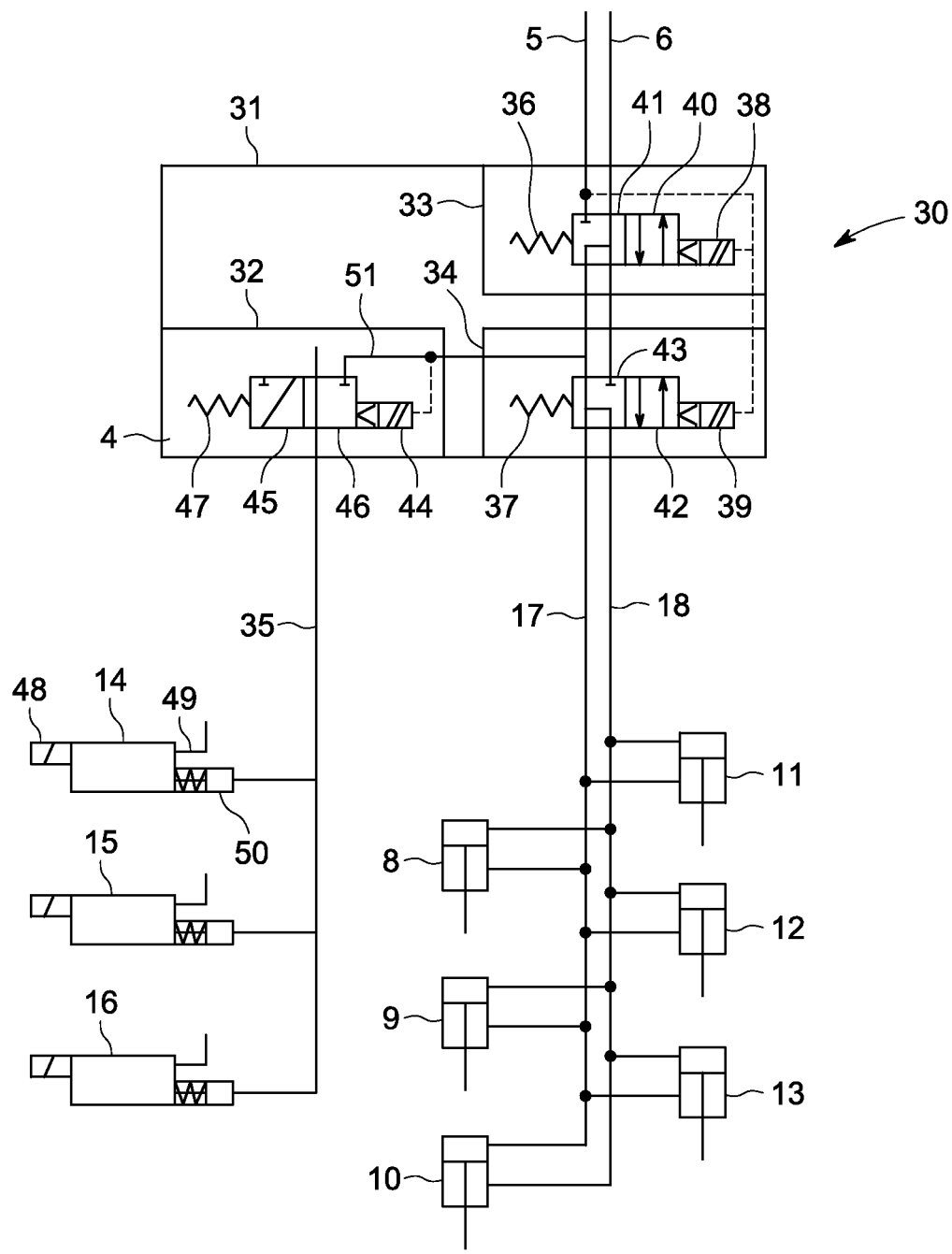
FIG. 2 shows schematically a hydraulic landing gear system embodying the invention.

FIG. 2 shows a hydraulic landing gear system 30 embodying the invention, wherein like reference numerals are used to denote features which are present in the system shown in FIG. 1.

The hydraulic pressure and return lines 5,6 lead to a first valve 33 and from there, directly to a second valve 34. First and second hydraulic conduits 17,18 lead from the second valve 34 directly to the hydraulic actuators 8,9,10,11,12,13. The hydraulic landing gear system 30 comprises a control valve block 31 in which the first valve 33 and the second valve 34 are disposed in series with respect to one another. By virtue of their serial arrangement no single valve failure can cause an inadvertent retraction of the landing gears. The valves of the system can be arranged as "line replaceable units", i.e. can be connected to one another via hydraulic lines permitting individual installation and removal of the valves. The first and second valves 33,34 take the place of the selector valve 2 and the cut out valve 3 and vent valve 7. Thus, rather than having three valves, only two valves are required by the present invention to control the flow of hydraulic fluid to the actuators 8 to 13. The first valve 33 comprises a supply valve, which connects the system to the aircraft hydraulic supply, and the second valve 34 comprises a direction valve which controls whether the gear is being extended or retracted. The control valve block 31 also includes an uplock control valve 4 to unlock the uplocks 14,15,16 at the appropriate point in the extension sequence. The uplock control valve 4 is located downstream of the supply 33 and direction 34 valves to provide the small flow of hydraulic fluid necessary for operating the uplock actuators.

In the embodiment shown in FIG. 2, the supply and direction valves 33,34 have the same internal structure as one another. Both include a solenoid 38,39 for opening the valve, and a return spring 36,37 biasing the valve to a default position. Each valve is a 2-way valve having first and second settings 40,41; 42,43, the first setting 40,42 allowing hydraulic fluid to flow through the valve and the second setting 41,43 inhibiting the hydraulic pressure from the pressure line 5. The second setting is configured to provide a direct hydraulic flow path between the fluid conduits 17,18 which are on the downstream side of the control valve block 31. A hydraulic connection shown by a dashed line is provided between the solenoids 38,39 of the supply and direction valves and the hydraulic pressure line 5. The purpose of this connection is to provide a relatively low amount of hydraulic power to the solenoids to allow them to move the valve bodies of the valves 33, 34. Further, the solenoid 44 of the uplock valve is also hydraulically connected to the subsidiary source of hydraulic pressure that operates the uplock actuators 14,15,16, as shown by a dashed line.

The valve block 31 is designed incorporating rip-stop principles, wherein physical barriers are provided between the supply and direction valves 33,34 and the uplock valve 4, which prevent the propagation of cracks through the valve block 31 which could potentially affect the operation of the valves.

The uplock valve 4 is a two-way valve having two settings 45,46, respectively on and off. A solenoid 44 is operable to bias the valve to the left, thereby selecting the "off" setting 46. A spring 47 biases the valve to the right whereby the "on" setting 45 is the default selection. A hydraulic conduit 35 leads from the uplock valve 4 to the uplocks 14,15,16. The uplocks hold the landing gears and landing gear doors in the retracted position while the aircraft is airborne. Each uplock comprises a hydraulic uplock actuator 50 for effecting movement of the uplocks as well as an optional latch member 49 for holding the uplocks in the locked position, the latch member 49 being manually releasable. In normal operation, only the hydraulic uplock actuator 50 is needed to control the uplocks. A solenoid 48 is also provided in connection with each uplock for unlocking the uplock in the event of a hydraulic failure. When the supply valve 33 is in the open setting 40, hydraulic pressure is transmitted therefrom to the uplock valve 4 via a subsidiary conduit 51.

Referring to FIGS. 3A to 3D, the supply and direction valves 33,34 are shown schematically in the different possible settings. The hydraulic pressure 5 and return 6 lines are arranged the opposite way round to that shown in FIG. 2.

Figure 3B:
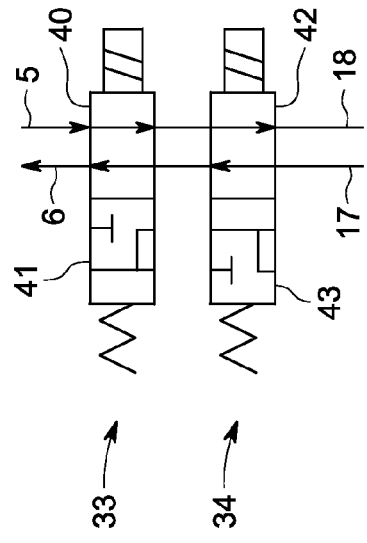
FIGS. 3A, 3B, 3C and 3D show schematically various configurations of a control valve of the system shown in FIG. 2.
Figure 3D:
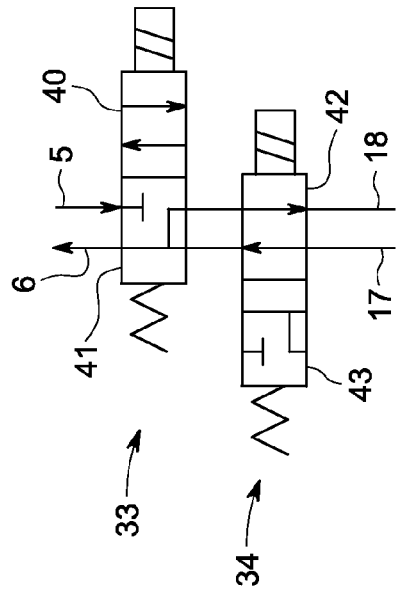
Figure 3A:
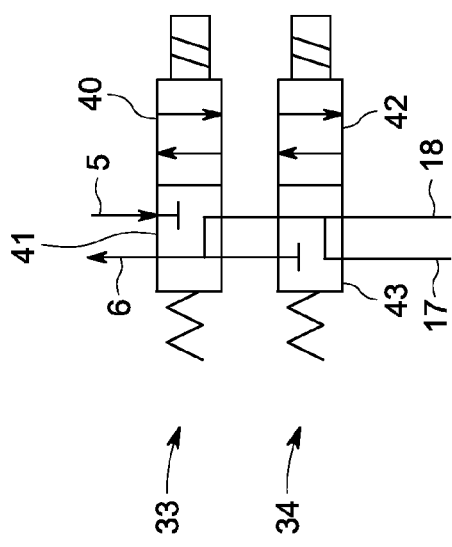

In FIG. 3A, the system is in a neutral configuration with both the supply valve 33 and the direction valve 34 in the "off" positions 41,43. In this configuration, the hydraulic conduits 17,18 are interconnected and the landing gears are free to extend under freefall conditions, i.e. under the influence of gravity.

FIG. 3B illustrates the system with both the supply and direction valves 33,34 energised to the "on" positions 40,42. In this configuration, the landing gears retract.

Figure 3C:
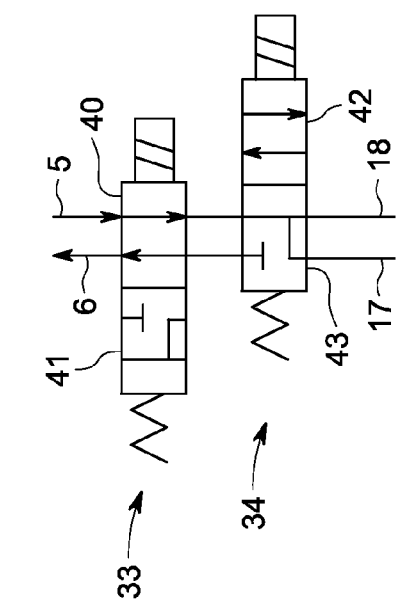

FIG. 3C illustrates the system with the supply valve in the "on" position 40 and the direction valve 34 in the "off" position. This may correspond to the situation where the supply valve 40 has jammed open due to a fault. The landing gears extend in this configuration.

FIG. 3D shows the system with the supply valve 33 closed (setting 41) and the direction valve 34 open (setting 42). This may correspond to the situation where the direction valve 34 has jammed open due to a fault. Again, the landing gears will extend in this configuration.

Figure 4:
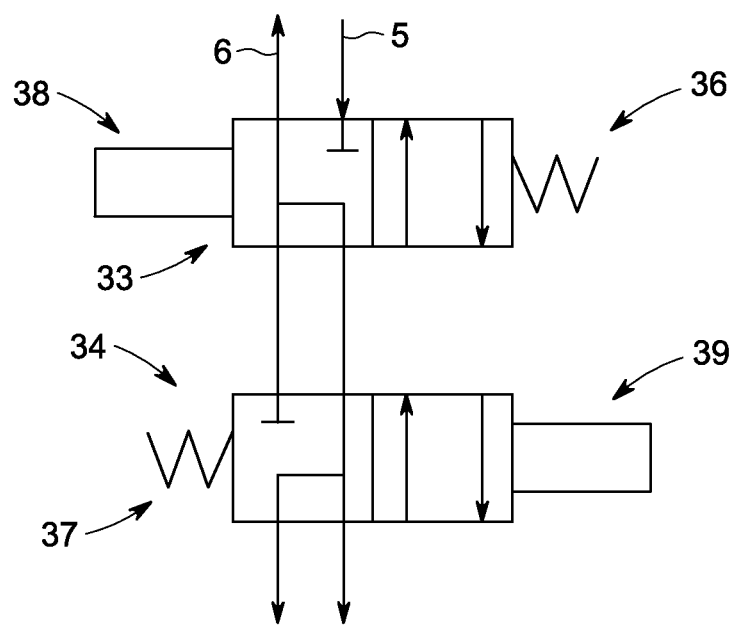
FIG. 4 is a schematic cross-sectional view of a hydraulic landing gear system according to a further embodiment of the invention.

FIG. 4 shows an alternative embodiment of the invention including a variation on the way in which the supply and direction valves 33,34 are arranged. The supply and direction valves 33,34 are arranged in a back-to-back layout, wherein the solenoid 38 of the first valve 33 is generally aligned with the return spring 37 of the second valve 34 and the solenoid 39 of the second valve 34 is generally aligned with the return spring 36 of the first valve 33. As shown, the solenoid 38 of the supply valve 33 is positioned on the left hand side of the supply valve and the solenoid 39 of the direction valve 34 is arranged on the right hand side of the direction valve as shown in the drawing. The springs 36 and 37 which bias the valves closed are provided at the opposite ends of the valves 33, 34 to the solenoids 38, 39. The valve settings in FIG. 4 are equivalent to FIG. 3A, i.e. both of the valves are in the off positions and the landing gears are free to extend under the influence of gravity.

The configuration of the gear downlock actuators and the gear actuators described herein is an example of many different forms that the actuators can take in practice, and the actuation control system of the present invention is not limited to the actuator arrangements disclosed above.

What is claimed is:

1. An actuation control system for an aircraft landing gear, the actuation control system comprising:
   a hydraulic fluid pressure transmission line connectable to a hydraulic pressure source;
   at least one hydraulic actuator for extending and/or retracting a landing gear; and
   a supply valve and a direction valve arranged in series along the hydraulic fluid pressure transmission line, the supply valve and the direction valve being adjustable to control the hydraulic pressure supplied to the at least one hydraulic actuator,
   wherein an open position of the supply valve in combination with an open position of the direction valve cause retraction of the landing gear, and
   wherein an open position of only one of the supply valve and the direction valve causes no retraction of the landing gear when the landing gear is already extended.

2. An actuation control system according to claim 1, wherein when at least one of the supply valve and the direction valve is in a closed position, the system causes the landing gear to extend.

3. An actuation control system according to claim 1, wherein the supply valve and the direction valve have substantially the same internal structure as one another.

4. An actuation control system according to claim 1, wherein the supply valve and the direction valve comprise 2-way valves.

5. An actuation control system according to claim 1, wherein the supply valve and the direction valve are solenoid actuated and spring biased to their closed positions.

6. An actuation control system according to claim 1, wherein the supply valve and the direction valve are directly connected to one another.

7. An actuation control system according to claim 1, wherein the supply valve and the direction valve are situated within a valve block.

8. An actuation control system according to claim 7, further including one or more barriers for preventing the propagation of cracks.

9. An actuation control system according to claim 7, wherein an uplock valve is included in the valve block.

10. An actuation control system according to claim 1, wherein the supply valve and the direction valve are in hydraulic contact with one another.

11. An actuation control system according to claim 1, further including at least one uplock valve.

* * * * *